Patented May 15, 1928.

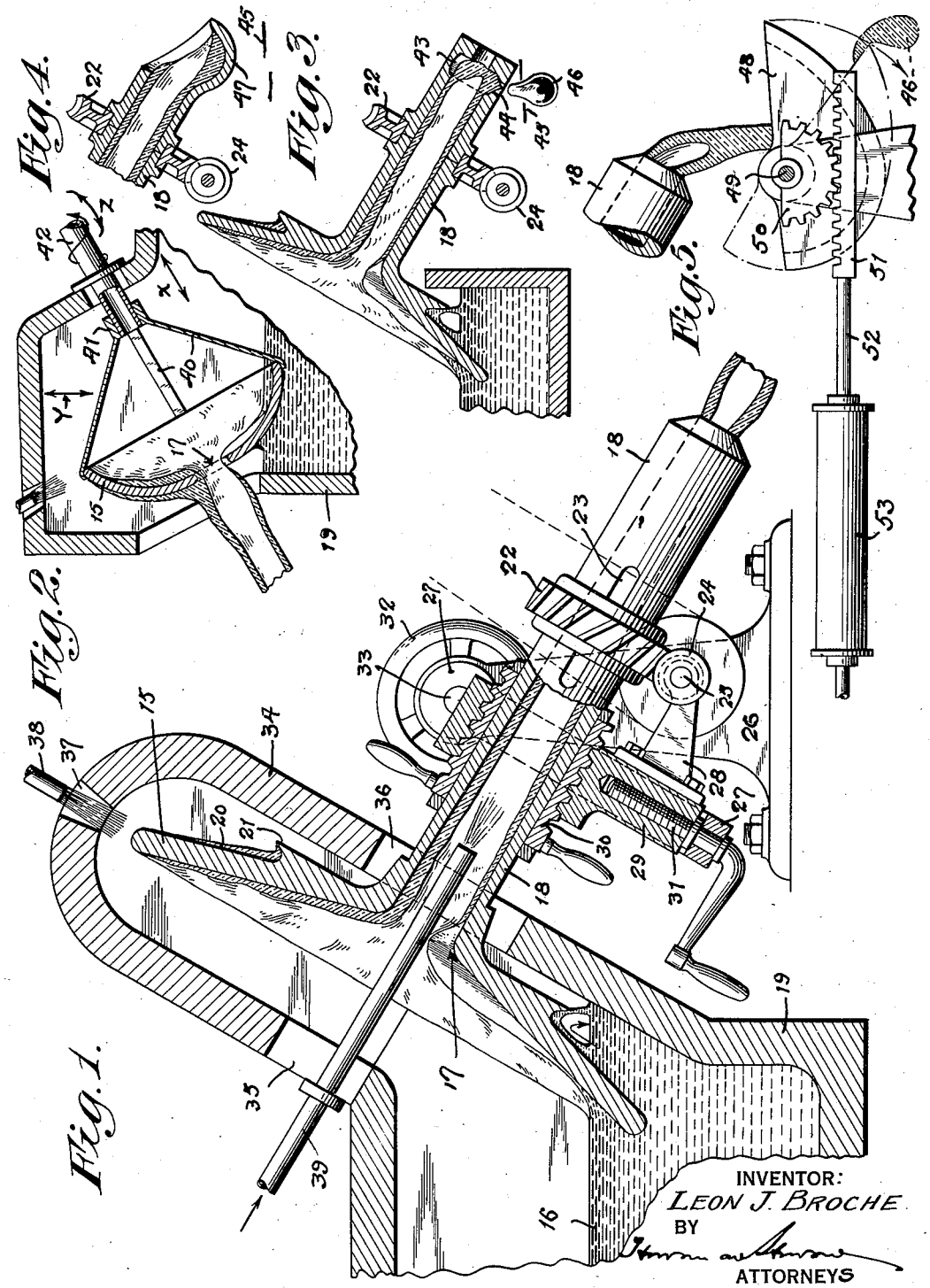

1,670,058

UNITED STATES PATENT OFFICE.

LÉON JEAN BROCHE, OF ST. CLOUD, FRANCE, ASSIGNOR TO TROPENAS COMPANY, OF NEW YORK, N. Y., A CORPORATION OF DELAWARE.

METHOD AND APPARATUS FOR USE IN THE MANUFACTURE OF GLASSWARE.

Application filed April 19, 1927. Serial No. 185,037.

My invention relates to method and apparatus for use in the manufacture of glassware, and particularly to the feeding of molten glass from a container preparatory to, or as a preliminary part of, a forming operation. My invention is related to, and forms a continuation in part of, my copending application filed September 20, 1926, Serial No. 136,632. In said application I have shown and described a rotary feeder arranged on an axis inclined to the surface of the bath into which the lower peripheral area of the feeder dips. The adhering glass, lifted from the bath by the rotation of the feeder, gathers toward the axis of the lower inclined face of the feeder for delivery therefrom. My present invention provides a rotary feeder of the same general type which, in like manner, has its axis inclined to the plane of the surface of the bath, and dips at its lower periphery into the bath. The molten glass, however, instead of being lifted solely on the lower inclined face of the feeder, is lifted on the upper face thereof, and gathering toward its axis is delivered through an axial opening and generally through a hollow boss in register with said opening. The delivery may be either continuous for the formation of tubes or rods, or intermittent in the form of gobs for the formation of independent objects such as bottles, jars, etc.

Inasmuch as the structure of the container for the molten glass and the apparatus by which the delivered glass is manipulated or shaped, do not enter into my invention, I have either omitted illustration of these features entirely or shown them only diagrammatically in the accompanying drawings, in which—

Fig. 1 is a vertical section through a feeder in which my invention is embodied in one form;

Fig. 2 is a diagrammatic vertical section through a modified construction;

Fig. 3 is a similar view of another modification adapted to gob feed;

Fig. 4 is a like view of another modification for the same purpose; and

Fig. 5 is a side view of an auxiliary device by which a continuous delivery may be converted into an intermittent gob feed.

In the form shown in Fig. 1, my improved feeder comprises a rotary pick-up element in the form of a dished or cone member 15 of refractory material or metal alloy capable of withstanding the temperatures to which it is subjected. It is supported in any suitable fashion with its axis inclined to the plane of the surface of the bath 16 of molten glass, and with its dished or concaved surface faced upward. At its center the disc is apertured as at 17 and in the form shown in Fig. 1, this aperture communicates with the bore of a tubular delivery boss 18 which extends beyond the boundary wall 19 of the container for the molten glass.

In order that the underlying or general features of my invention may be realized before dealing with the details of construction, I desire to point out that upon rotation of the feeder, with its lower peripheral margin dipping into the molten bath 16 as indicated, the glass adheres to the disc and is picked up by the submerged area and lifted with the latter as it rotates. As the result of the combined action of gravity, and rotation of the feeder, the molten glass eventually gathers at the axial opening 17 and passes through this port. In the construction shown in Fig. 1, it flows downward in the inclined rotating boss 18, adhering to its walls as a fluid cylinder, and escapes from the lower end of the boss.

I am aware that it has heretofore been proposed to feed glass to the interior of a rotating inclined cylinder, but this feed has been accomplished by flow directly from the furnace, below the level of the molten glass in which the cylinder has necessarily been arranged. This practice is attended with serious disadvantages, among which may be mentioned that—

(1) In case of derangement of the cylinder mechanism the flow from the furnace continues through the cylinder without shaping the glass into tubular form, the rotating cylinder forming merely a spout;

(2) In case of any derangement of the furnace gate mechanism, so that the flow cannot be shut off, the feed continues regardless of conditions which may necessitate its interruption in some fashion;

(3) The glass level at the furnace port must be maintained substantially constant to insure a substantially even flow;

(4) Special fore-hearth construction of very accurate detail must be provided to insure proper flow.

All of these disadvantages are obviated by the present construction since, on the halt of the feeder drive, the feed itself halts. There is no over-flow since the level of the bath is below the boundary wall of its container. The glass level in the container may vary to a considerable extent without appreciably varying the feed even though the feeder itself is not adjusted; while adjustment of the feeder, readily accomplished, enables the operator to follow the glass level in the furnace with as great accuracy as desired to obtain uniform delivery.

No modification in the shape of furnace or forehearth construction is necessary beyond slight variations to accommodate it to the feeder, and these variations necessitate no accuracy of detail in order to obtain proper operation of the feeder.

I have explained that the feeder 15 delivers the lifted glass from its dished upper surface to the axial port 17. The submergence of its lower periphery in the molten bath, however, results in the lifting of glass on its lower or convex surface 20. Since the glass lifted on this surface also tends to gather toward the axis of the rotor, and to follow the outer surface of the tubular boss 18 (which would not be desirable in a construction such as shown in Fig. 1) I provide one or more annular ribs or gutters 21 on the surface 20 which obstruct the axial flow of glass on the surface 20 and return it to the bath 16.

Some such means for returning to the bath the glass lifted on the lower or convex surface of the feeder is essential when the feeder is supported and driven from the boss 18. This is the construction shown in Fig. 1, in which a worm-gear 22 is slidably keyed at 23 on the boss and is driven by a worm 24 on the motor shaft 25. Supporting standards 26 on opposite sides of the feeder carry a pivoted yoke 27 in which the feeder is mounted. Brackets 28 for the worm-shaft 25 are secured to a slide block 29 guided in the arms of the yoke 27. The head of block 29 surrounds the bearing sleeve 30, in which the feeder boss 18 is journalled. A screw connection between the block 29 and bearing sleeve 30, permits axial adjustment of the feeder with respect to the block 29. A hand-operated screw 31, journalled in the cross bar of yoke 27 and taking into the block 29, affords means for vertically adjusting the feeder in the yoke 27. A clutch wheel 32 clamps the yoke 27 in the position to which it is adjusted around its pivot 33.

The feeder mounting described thus permits vertical, axial and angular adjustment to enable it to follow the glass level in container 19, and to adapt itself to various constructions of the fore-hearth or container, as well as to obtain various feeds. It will be obvious that by varying the inclination of the feeder axis not only is the quantity of glass which is lifted upon the disc 15 varied, but also the speed of its downward flow through the tubular boss 18.

I have shown the disc 15 housed in by a removable cap member 34 adapted to be placed upon the walls of the glass container 19, the parting between the cap and body being located at the slots 35 and 36, so that the feeder and its associated parts may be readily withdrawn when the cap is removed. The top of the cap is apertured at 37 to admit the burner 38, should the latter prove necessary to maintain proper temperature in the feeder chamber. I have also indicated pipe 39 entering the feeder chamber through the port 35 and extending into the tubular boss 18. Pipe 39 may be utilized as a burner for supplying heat to the interior of the boss 18, or for supplying air under pressure to assist in the formation of the usual bubble at the delivery end of the boss 18 when drawing a tubular product.

In the modification shown in Fig. 2, I have omitted the boss in extension of the central aperture 17 of the feeder 15, and have supported the latter by means of a spider 40, the arms of which engage at one end the peripheral area of the feeder, and at their opposite ends a hub 41 secured to a rotary tubular shaft 42. The latter may be driven in any suitable fashion (for example by the mechanism shown in my application above mentioned) and I have indicated by the arrow $x$ that the feeder is adjustable in the direction of its length; by the arrow $y$ that it is vertically adjustable, and by the arrow $z$ that it is rotatable in opposite directions. I have also omitted from this construction the annular dams or gutter ribs by which the glass is returned from the convex or lower surface of the feeder to the bath. Consequently the glass lifted on both upper and lower surfaces of the disc gathers without impediment toward the axial opening 17 and there unite to form a mass which may be drawn in tubular or rod form from the disc. It is obvious that the glass feeding capacity of this construction is double that of the construction first described, thus permitting a larger tube to be drawn or a tube of less diameter having thicker walls, or an accelerated drawing operation for the production of a greater length of tubing or rod.

In Fig. 3 I have indicated at the delivery end of the boss 18 of Fig. 1, an inner peripheral channel 43 which communicates with a peripheral aperture 44. This construction is adapted for the delivery of gobs since the fluid cylinder of glass flowing down the interior of the boss, is halted by and gathers in the channel 43 and exits therefrom through the port 44 when the latter faces downward during the rotation of the feeder. The drive of the latter may be momentarily halted to facilitate this discharge. The usual shears 45 may be used to sever the gob 46.

Or again, as illustrated in Fig. 4, the end of the boss may be shaped to form a cup 47 which, during rotation, gathers the glass delivered thereto through the boss 18 and discharges it as a gob when the cup 47 is inverted.

In Fig. 5 I have illustrated still another way of securing an intermittent or gob feed in combination with a rotary feeder of the type shown in Fig. 1. For this purpose I provide an oscillating cup 48 mounted on axis 49, with which a segmental gear 50 is fast. Cooperating with the segmental gear 50 is a rack 51 at the end of a piston rod 52, the piston of which reciprocates in a cylinder 53. The cup 48 is supported in any appropriate fashion below the delivery end of the boss 18 to receive the discharge from the latter. Periodically the cup is inverted and discharges its contents in the form of a gob 46. The shape of the gob will vary with the speed of oscillation of the cup 48, the manipulation of which may be so timed as to secure gobs of different shapes for different purposes. It will also be obvious that the size of the gob may be varied by causing the oscillation of the cup at longer or shorter intervals since the feed to the cup from the boss 18 is substantially continuous. It will of course be understood that the oscillation of the cup may be effected in various ways other than that shown; for example, the rack 51 might be operated by a cam. Various other expedients will readily occur to those dealing with the problem.

With the understanding that the accompanying drawings are merely indicative of the thoughts which underlie my invention, and that the latter are susceptible of embodiment in many different forms without departing from what I claim as my invention,

I claim—

1. In the manufacture of glass products, the step of feeding glass from a molten bath thereof, which comprises picking up glass from the bath on the upper surface of a feeder rotating on an axis inclined to the plane of the surface of the bath, and discharging the lifted glass through the rotor.

2. In the manufacture of glass products, the step of feeding glass from a molten bath thereof, which comprises picking up glass from the bath on the upper surface of a feeder rotating on an axis inclined to the plane of the surface of the bath, and discharging the lifted glass through the rotor substantially at its axis.

3. In the manufacture of glass products, the step of feeding glass from a molten bath thereof, which comprises picking up glass from the bath on the upper surface of a feeder rotating on an axis inclined to the plane of the surface of the bath, and discharging the lifted glass through the rotor in hollow tubular form.

4. In the manufacture of glass products, the step of feeding glass from a molten bath thereof, which comprises picking up glass from the bath on the upper surface of a feeder rotating on an axis inclined to the plane of the surface of the bath, discharging the lifted glass through the rotor, and returning to the bath such glass as adheres to the lower surface of the rotor.

5. The combination with a bath of molten glass, of a feeder for delivering glass from said bath, said feeder comprising a rotary tubular member arranged on an axis inclined to the plane of the surface of the bath, and a flange at one end of said tubular member, said flange dipping at its lower periphery into the surface of the bath and serving to lift glass therefrom and to deliver it to the interior of said tubular member.

6. The combination with a bath of molten glass, of a feeder for delivering glass from said bath, said feeder comprising a rotary tubular member arranged on an axis inclined to the plane of the surface of the bath, and a flange at one end of said tubular member, said flange dipping at its lower periphery into the surface of the bath and serving to lift glass therefrom and to deliver it to the interior of said tubular member, together with means on said flange for preventing lifted glass from flowing therefrom upon the exterior of said tubular member.

7. In apparatus for the manufacture of glass products, a feeder for molten glass comprising a rotary tubular member arranged on an axis inclined to the plane of the surface of the bath, in combination with a rotary pick-up member adapted to dip at its lower periphery into the molten glass and to deliver glass lifted thereon to the interior of the rotary tubular member.

8. In apparatus for the manufacture of glass products, a feeder for molten glass comprising a rotary pick-up member arranged on an axis inclined to the surface of the bath of molten glass and dipping at its lower periphery into the latter, said pick-up member being apertured toward its axis and delivering glass from its upper inclined surface through said aperture in the form of an annulus.

9. In apparatus for the manufacture of glass products, a feeder for molten glass comprising a rotary pick-up member arranged on an axis inclined to the surface of the bath of molten glass and dipping at its lower periphery into the latter, said pick-up member being apertured toward its axis and delivering glass from its upper inclined surface through said aperture in the form of an annulus, in combination with a tubular axial extension of said rotary pick-up member through which said annular discharge from the pick-up member passes in the form of a fluid cylinder.

10. In apparatus for the manufacture of glass products, a feeder for molten glass comprising a rotary pick-up member arranged on an axis inclined to the surface of the bath of molten glass and dipping at its lower periphery into the latter, said pick-up member being apertured toward its axis and delivering glass from its upper inclined surface through said aperture in the form of an annulus, in combination with a tubular axial extension of said rotary pick-up member through which said annular discharge from the pick-up member passes in the form of a fluid cylinder, together with means at the discharge end of said tubular extension for establishing an intermittent feed of the glass to associated apparatus.

11. In apparatus for the manufacture of glass products, a feeder for molten glass comprising a rotary pick-up member arranged on an axis inclined to the surface of the bath of molten glass and dipping at its lower periphery into the latter, said pick-up member being apertured toward its axis and delivering glass from its upper inclined surface through said aperture in the form of an annulus, in combination with a tubular axial extension of said rotary pick-up member through which said annular discharge from the pick-up member passes in the form of a fluid cylinder, together with means at the discharge end of said tubular extension, but independent thereof, for establishing an intermittent feed of the glass to associated apparatus.

In testimony whereof I have signed my name to this specification.

LÉON JEAN BROCHE.